US008251135B2

(12) United States Patent
Santanach et al.

(10) Patent No.: US 8,251,135 B2
(45) Date of Patent: Aug. 28, 2012

(54) FIXING DEVICE FOR AN EXPANSION VALVE OF A MOTOR VEHICLE AIR-CONDITIONING SYSTEM

(75) Inventors: Francesc Santanach, Barcelona (ES); Jorge Guzman, Barcelona (ES); José Cremades Blasco, L'Hospitalet (ES)

(73) Assignee: Frape Behr S.A., Barcelona (ES)

( * ) Notice: Subject to any disclaimer, the term of this patent is extended or adjusted under 35 U.S.C. 154(b) by 210 days.

(21) Appl. No.: 10/585,762

(22) PCT Filed: Dec. 8, 2004

(86) PCT No.: PCT/EP2004/013968
§ 371 (c)(1),
(2), (4) Date: Aug. 22, 2007

(87) PCT Pub. No.: WO2005/068230
PCT Pub. Date: Jul. 28, 2005

(65) Prior Publication Data
US 2007/0292202 A1  Dec. 20, 2007

(30) Foreign Application Priority Data
Jan. 13, 2004  (EP) .................................... 04000523

(51) Int. Cl.
*F28F 9/26* (2006.01)
(52) U.S. Cl. ........ 165/178; 296/208; 248/68.1; 403/391
(58) Field of Classification Search .................. 403/389, 403/391, 396, 336; 248/68.1, 74.1; 285/124.2, 285/124.3, 124.5, 124.1; 165/178; 296/208; 62/225, 299; 411/339
See application file for complete search history.

(56) References Cited

U.S. PATENT DOCUMENTS

| 3,869,153 | A | * | 3/1975 | De Vincent et al. | ....... 285/124.3 |
| 4,468,054 | A | * | 8/1984 | Orth | ........................... 285/124.3 |
| 4,589,265 | A | * | 5/1986 | Nozawa | ........................ 165/176 |
| 5,868,426 | A | * | 2/1999 | Edwards et al. | ......... 296/203.02 |
| 6,070,659 | A | * | 6/2000 | Hosoya | ........................ 165/178 |
| 6,776,421 | B2 | * | 8/2004 | Florence et al. | ........... 285/124.5 |
| 6,866,300 | B2 | * | 3/2005 | Hayes et al. | ............... 285/124.2 |
| 6,981,737 | B2 | * | 1/2006 | Welsh | ........................... 296/208 |
| 7,469,934 | B2 | * | 12/2008 | Inaba et al. | ................ 285/124.3 |
| 7,475,916 | B2 | * | 1/2009 | Muller et al. | .............. 285/124.2 |

FOREIGN PATENT DOCUMENTS

| FR | 2 834 672 A1 | 7/2003 |
| JP | 56-093316 U | 7/1981 |
| JP | 04-014974 U | 2/1992 |
| JP | 09-123749 A | 5/1997 |
| JP | 09-267626 A | 10/1997 |

(Continued)

*Primary Examiner* — Michael P Ferguson
(74) *Attorney, Agent, or Firm* — Foley & Lardner LLP

(57) ABSTRACT

The invention relates to a fixing device (8) for a expansion valve (4) of a motor vehicle air-conditioning system (1), said expansion valve (4) being connected to two lines (5, 6). The two lines (5, 6) are positioned in relation to each other by means of a line positioning element (7) which is embodied as a sheet metal stamped part, said line positioning element comprising two slits which are used to receive the lines. The expansion valve (4) can be arranged on the housing (2), with the aid of the line positioning element (7), and can be fixed in an at least rotationally fixed manner, wherein one part of the motor vehicle air-conditioning system (1) is arranged.

4 Claims, 8 Drawing Sheets

FOREIGN PATENT DOCUMENTS

| JP | 10-100654 A | 4/1998 |
| JP | 2000-203251 A | 7/2000 |
| WO | WO 01/74615 A1 | 10/2001 |
| WO | WO 03/081113 * | 10/2003 ................. 285/124.2 |

* cited by examiner

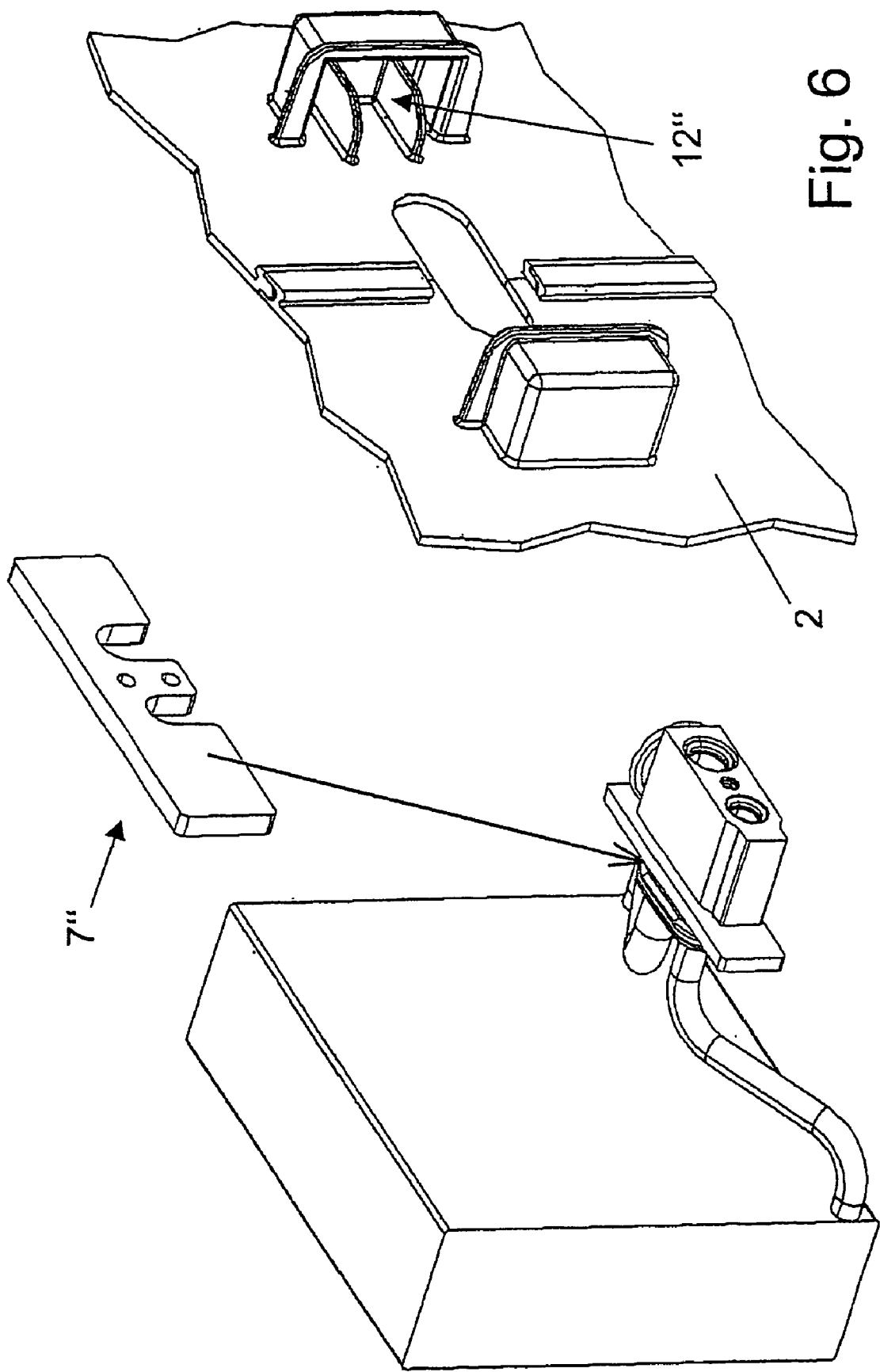

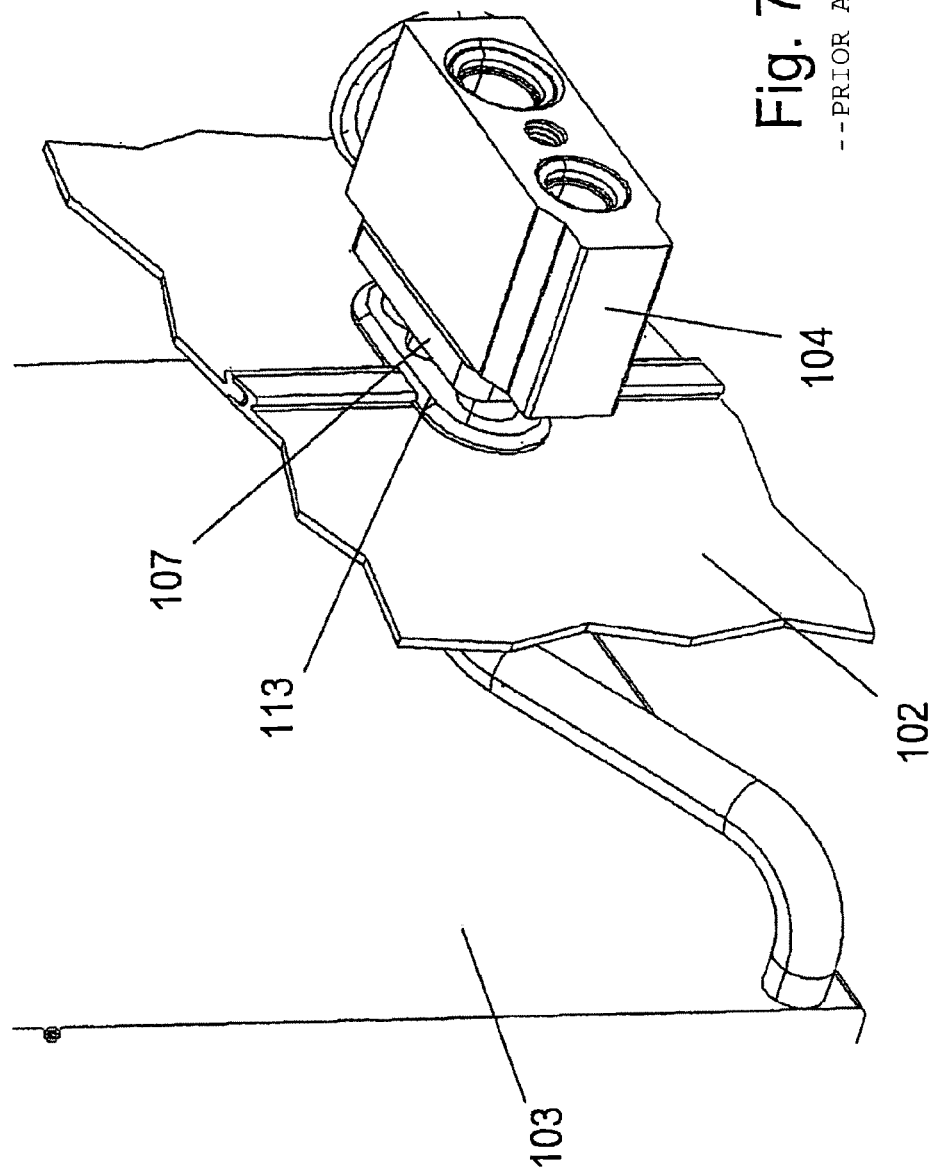
Fig. 7 --PRIOR ART--

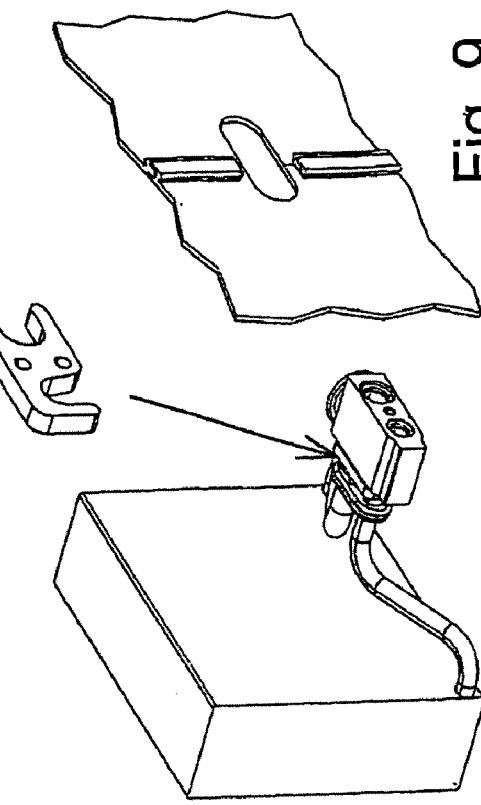
Fig. 9 --PRIOR ART--
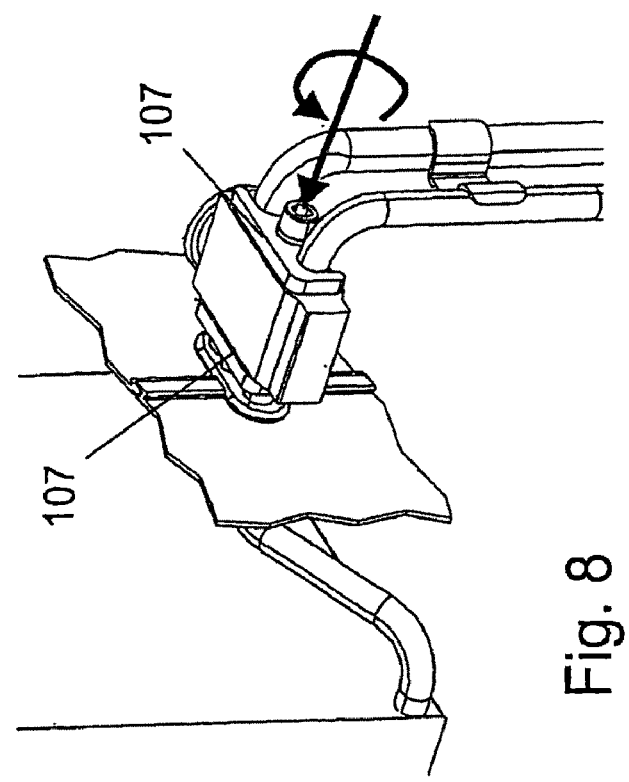
Fig. 8 --PRIOR ART--

# FIXING DEVICE FOR AN EXPANSION VALVE OF A MOTOR VEHICLE AIR-CONDITIONING SYSTEM

The invention relates to a fixing device for an expansion valve of a motor vehicle air-conditioning system.

BACKGROUND

Conventionally, as illustrated in FIGS. 7 to 9, to fix an expansion valve 104, the line leading to an evaporator 103 and the line coming from the evaporator 103 are guided through a housing opening, which is sealed by means of a sealing element 113, of a multi-part housing 102, are positioned by means of a line-positioning element 107 and the line-positioning element 107 is screwed down on the expansion valve 104 by means of two screws. In this case, the size of the line-positioning element 107 is kept as small as possible.

On the other side of the expansion valve 104, the positioning and fixing of the connecting lines takes place in a corresponding manner, with a central screw being provided to fix the second line-positioning element 107. However, high torsional forces frequently occur in the fixing, as a result of which problems occur, in particular with the low rigidity in the case of a Nocoloc® brazing joint.

SUMMARY

It is the object of the invention to provide an improved fixing device for an expansion valve of a motor vehicle air-conditioning system.

According to the invention, a fixing device is provided for an expansion valve of a motor vehicle air-conditioning system, the expansion valve being able to be fitted and being able to be fixed in an at least twist-proof manner with the aid of the line-positioning element on a housing in which a part of the motor vehicle air-conditioning system, in particular the evaporator, is arranged. The rotationally secure fitting on the housing makes it possible in a simple manner to prevent twisting when screwing the second line-positioning element to the expansion valve.

In this case, two slots for receiving the lines are provided in the line-positioning element, said slots preferably being arranged parallel to each other to facilitate the installation.

Two further slots or through holes are preferably provided in the line-positioning element, said slots serving to position and/or fix the line-positioning element on the housing. If two slots running in the longitudinal direction of the line-positioning element are provided, then they can be pushed or pressed onto projections correspondingly formed on the housing, thus preventing twisting. In the case of through holes, screws can be screwed into screw domes provided on the housing, so that a rotationally secure fixing is likewise possible.

As an alternative, the line-positioning element can be designed in such a manner that it clearly protrudes beyond the expansion valve and is pushed into receptacles which are of pocket-shaped design, are formed on the housing or are fitted thereon and hold the line-positioning element and therefore also the expansion valve, which is fixed to the same, in a rotationally secure manner. Ribs running in the push-in direction are preferably provided, said ribs keeping the line-positioning element sufficiently spaced apart from the housing, in particular with respect to a sealing element provided on the housing.

Other possibilities of fixing the line-positioning element on the housing or a combination of the described fixing devices are likewise possible.

To fix the expansion valve on the line-positioning element, at least one hole, preferably two holes, are provided in the line-positioning element to pass a screw through and to screw the same in the expansion valve.

The housing is preferably of multi-part design, with a housing joint running transversely through the housing-side part of the fixing device. This facilitates the assembly in particular. In this case, in the housing joint an opening is preferably provided through which protrudes at least one line which is connected to the expansion valve.

A fixing device of this type for an expansion valve is used in particular for motor vehicle air-conditioning systems for fixing an expansion valve arranged in the vicinity of the evaporator.

The invention is explained in detail below using exemplary embodiments and with reference to the drawing, in which:

BRIEF DESCRIPTION OF THE DRAWINGS

FIG. 6 shows an illustration of the parts of FIG. 5, FIG. 7 shows a perspective view of a fitted fixing device in accordance with the prior art, FIG. 8 shows an illustration of the torsional force occurring in the case of the fixing device of FIG. 7, and FIG. 9 shows an illustration of the parts of FIG. 7.

DETAILED DESCRIPTION

Figure 1:
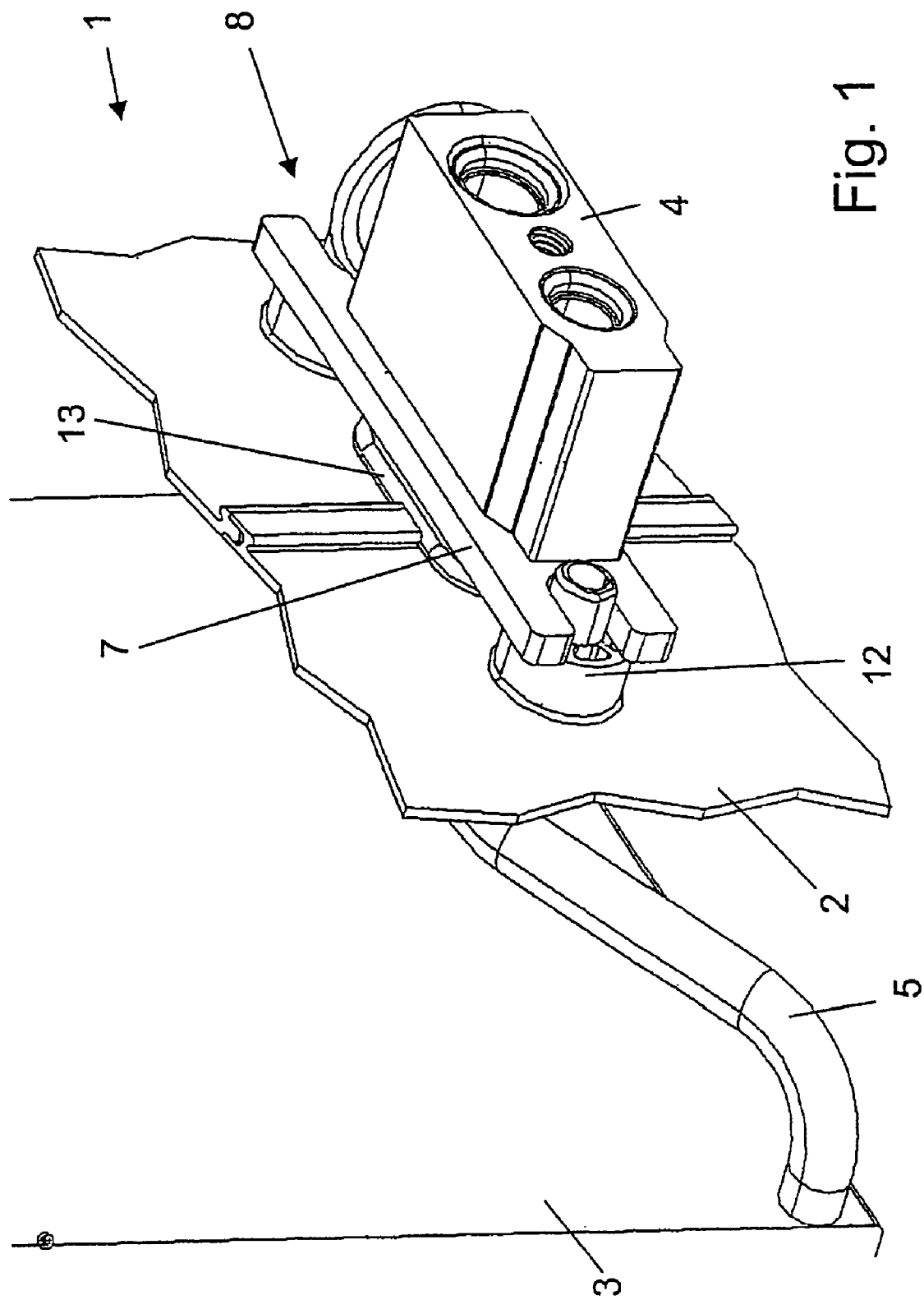
FIG. 1 shows a perspective view of a fitted fixing device according to the invention in accordance with a first exemplary embodiment.
Figure 2:
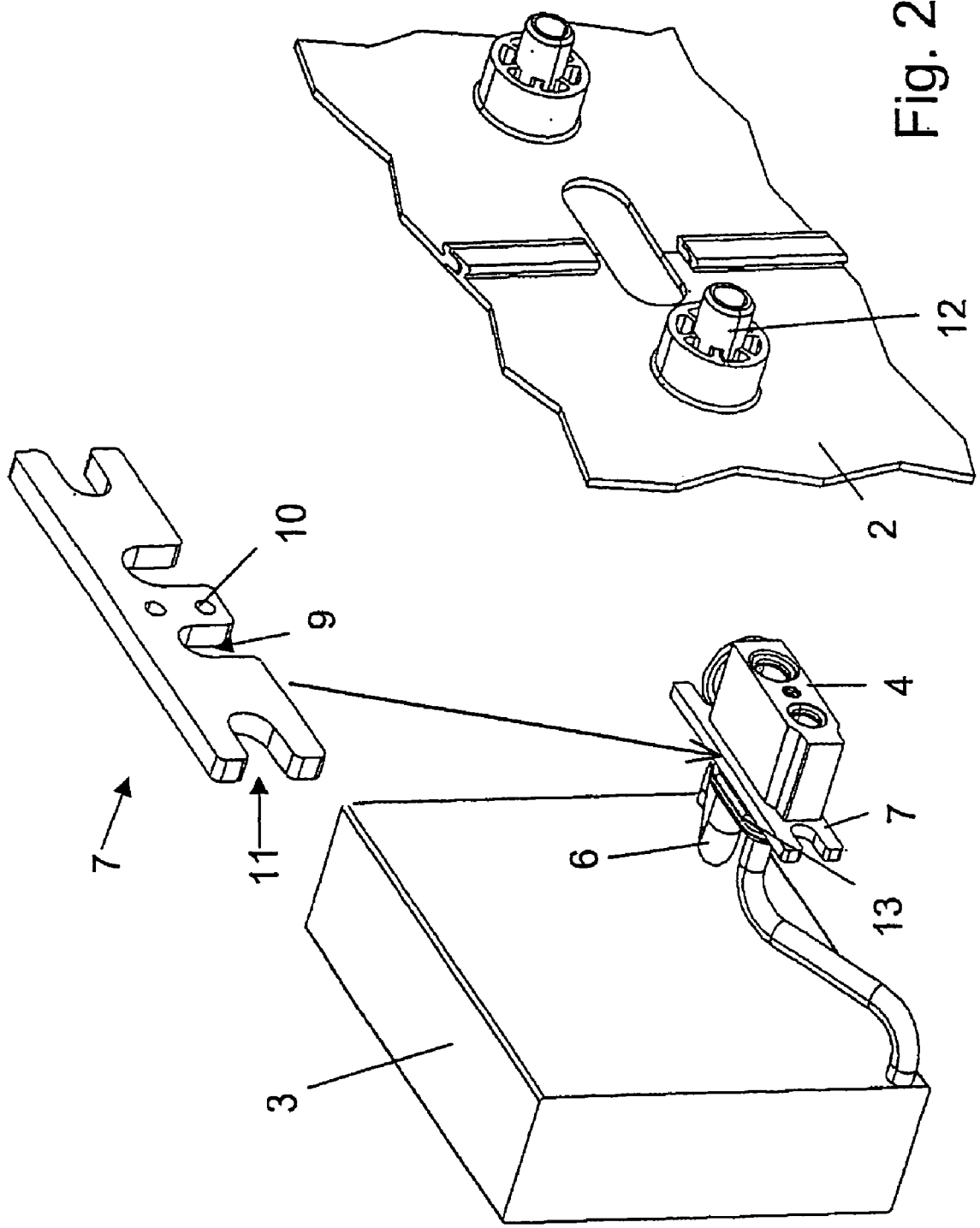
FIG. 2 shows an illustration of the parts of FIG. 1.
Figure 3:
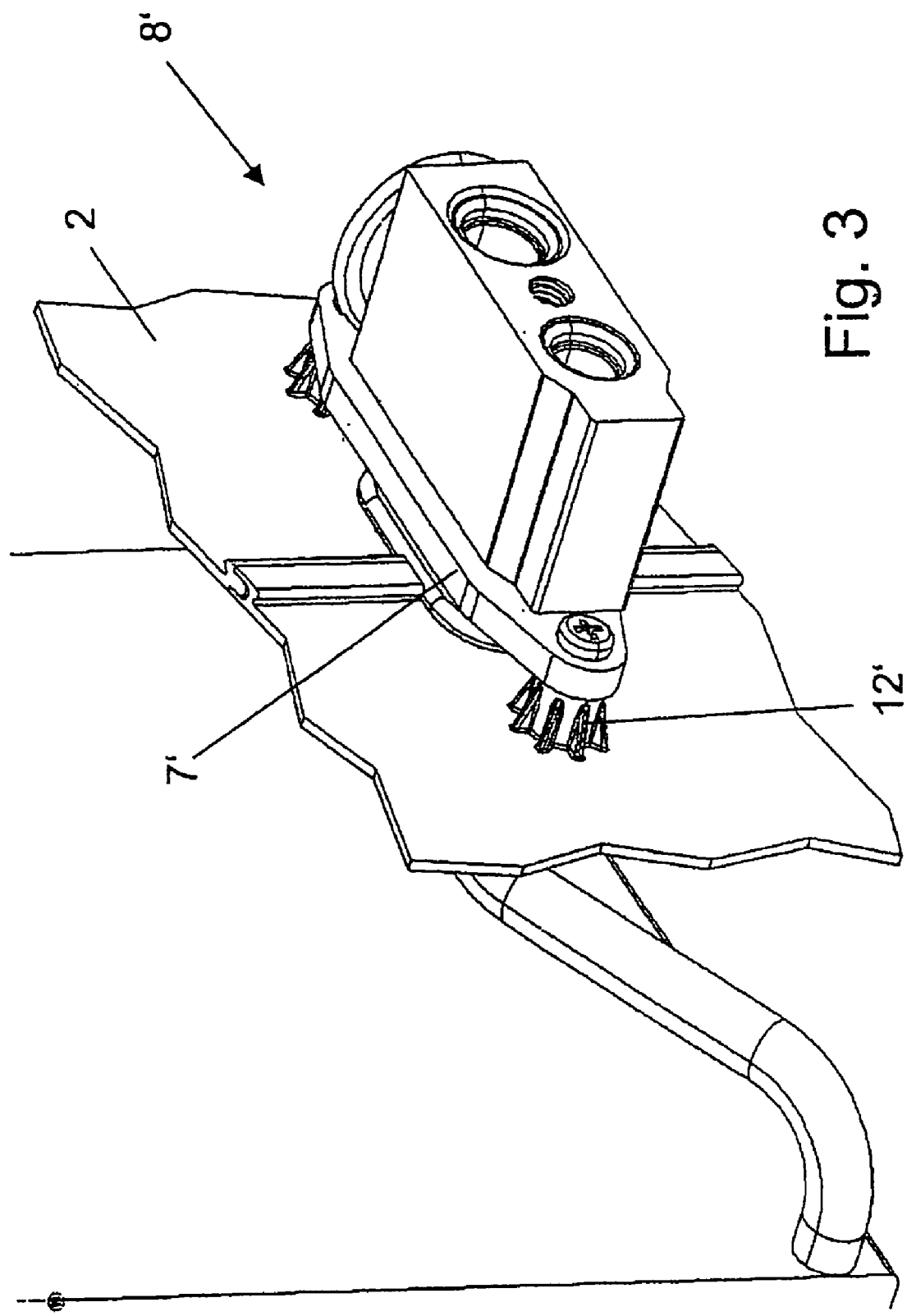
FIG. 3 shows a perspective view of a fitted fixing device according to the invention in accordance with a second exemplary embodiment.
Figure 4:
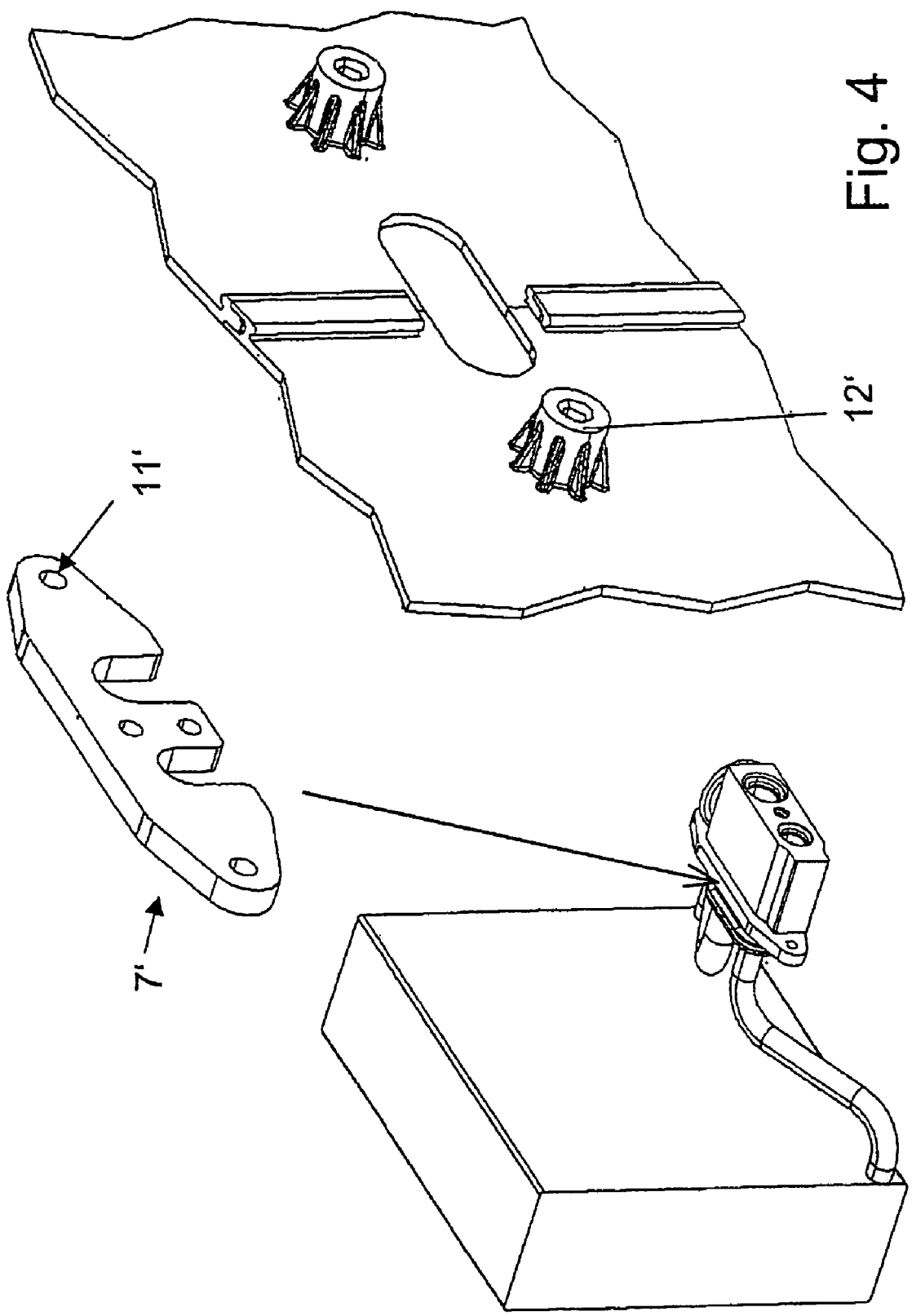
FIG. 4 shows an illustration of the parts of FIG. 3.

A motor vehicle air-conditioning system 1 with an evaporator 3 arranged in a housing 2 of multi-part design has an expansion valve 4. The expansion valve 4 is arranged in a first line 5 and a second line 6 via which refrigerating agent can be supplied to the evaporator 3 or can be removed from it. Only that section of the lines 5 and 6 which is connected to the evaporator 3 is illustrated in each case in the figures here, with the respective pipes ending at the expansion valve 4. With regard to the further course of the lines and the fitting of the corresponding pipes to the expansion valve 4, reference should be made to the prior art illustrated in FIG. 8.

The two lines 5 and 6 coming from the evaporator 3 are pre-positioned with respect to each other in their spacing in the region of the connecting points by means of a line-positioning element 7, which is of flat and approximately rectangular design and is part of a fixing device 8, for which purpose the line-positioning element 7 is provided with two slots 9 which run parallel to each other and extend perpendicularly toward the center longitudinal axis from a longitudinal side.

To fit the line-positioning element 7 on the expansion valve 4, two holes 10 are provided in the line-positioning element 7, through which holes screws are inserted and are screwed into corresponding threaded holes provided in the expansion valve 4, so that the line-positioning element 7 fixes the lines 5 and 6 on the expansion valve 4.

To fit the line-positioning element 7 on the housing 2, two further slots 11 are provided in the line-positioning element 7, said slots extending toward each other in the longitudinal direction of the line-positioning element 7.

The injection-molded housing 2 is composed of a plastic, for example PP-20T. In this case, two projections 12 are formed which are arranged and shaped in accordance with the further slots 11 of the line-positioning element 7, so that the line-positioning element 7 can be positioned on the housing 2 and, in particular, can be fitted in a rotationally secure manner, so that, when screwing the last screw (see FIG. 8), which serves for the fitting of a second line-positioning element (not illustrated, but compare the prior art described with reference to FIGS. 8 and 9), no twisting of the expansion valve 4 and of the lines 5, 6 can take place.

The second line-positioning element can be designed in accordance with the line-positioning element 107 corresponding to the prior art. This also ensures that the two line-positioning elements 7 and 107 cannot so easily be confused as previously, since they differ in their shape and not only by the number and arrangement of the holes.

To seal the housing 2, a sealing element 13 is provided by means of which the opening in the housing 2, through which the two lines 5 and 6 run, is tightly sealed with the lines 5 and 6 being incorporated. To protect the sealing element 13, the projection 12 is of two-stage design, so that the line-positioning element 7 is arranged spaced apart from the housing wall.

The second exemplary embodiment corresponds essentially to the first exemplary embodiment, so that only the differences are entered into in greater detail below.

Instead of the slots 11 running in the longitudinal direction of the line-positioning element 7, a respective through hole 11' is provided in the end regions of the line-positioning element 7' in accordance with the second exemplary embodiment, through which through hole a respective screw is inserted and is screwed into one of the projections 12', which are designed in this case as screw domes. The screw domes ensure inter alia that there is a sufficient distance between housing wall and line-positioning element 7'.

The fixing device 8' in accordance with the second exemplary embodiment, which fixing device is formed by the line-positioning element 7' in conjunction with the projections 12' of the housing 2, permits a secure fixing, not only with respect to the security against a possible twisting when screwing the last screw (cf. FIG. 8).

Figure 5:
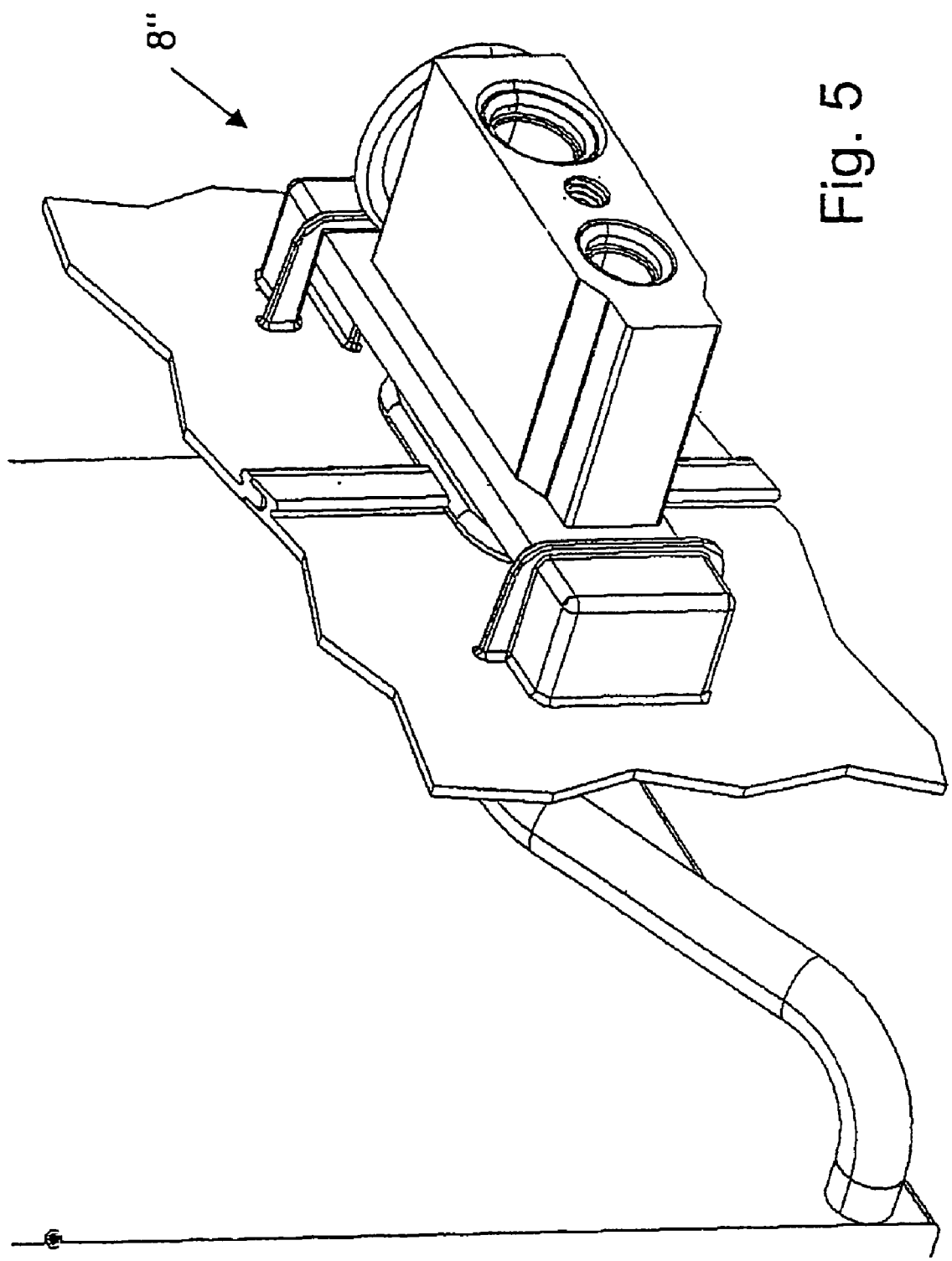
FIG. 5 shows a perspective view of a fitted fixing device according to the invention in accordance with a third exemplary embodiment.

In accordance with a third exemplary embodiment which is illustrated in FIGS. 5 and 6 and which essentially corresponds to the first and second exemplary embodiments, so that only the differences are explained in more detail below, the rotational securing of the line-positioning element 7" takes place in a form-fitting manner by means of projections 12" which are of pocket-like design and are formed on the housing 2, with the line-positioning element 7" having an essentially rectangular design. In this case, the projections 12" each comprise a pocket- or gate-shaped part and two ribs which run in the insertion direction, are rounded in their front region and serve for guidance when inserting the line-positioning element 7" and for spacing the same apart from the housing wall. In this case, the line-positioning element 7" in conjunction with the projections 12" of the housing 2 serve again as fixing device 8". The final fixing takes place in this case at the same time and automatically with the fixing of the housing part which has been placed on.

LIST OF DESIGNATIONS

1 Motor vehicle air-conditioning system
2, 102 Housing
3, 103 Evaporator
4, 104 Expansion valve
5 Line
6 Line
7, 7', 7", 107 Line-positioning element
8, 8', 8" Fixing device
9 Slot
10 Holes
11 Slot
11' Through hole
12, 12', 12" Projection
13, 113 Sealing element

The invention claimed is:

1. An air-conditioning system for a motor vehicle, comprising:
   a housing comprising a pair of coplanar housing parts joined by a housing joint longitudinally extending along respective mating edges of the housing parts, wherein an opening extends through the mating edges of the housing joint between an interior and an exterior of the housing, wherein each housing part includes a projection extending outwardly from an outer surface of the housing, the projections being disposed on opposing sides of the opening, and wherein each projection is formed in a single piece with a respective one of the housing parts;
   an evaporator disposed within the interior of the housing;
   an expansion valve disposed on the exterior of the housing;
   a pair of lines connecting the expansion valve to the evaporator and extending through the opening in the housing joint; and
   a positioning element configured to position the lines relative to each other, wherein the positioning element is a sheet-metal punched part having a longitudinal axis extending in a direction transverse to the longitudinal extension of the housing joint, the positioning element having a first set of two slots configured to receive the lines and a second set of two slots configured to fix the positioning element on the housing;
   wherein the first set of slots are spaced along a longitudinally extending edge of the positioning element and each extend toward an opposing longitudinally extending edge of the positioning element, wherein a respective one of the lines extends through each of the first set slots and the positioning element is fixed to the expansion valve; and
   wherein the second set of slots are longitudinally aligned and extend in a line toward each other at opposing longitudinal ends of the positioning element, wherein each of the second set of slots is arranged and shaped in accordance with a respective one of the projections such that the positioning element is pressed onto the projections to rotationally fix the positioning element and expansion valve on the housing.

2. The system as claimed in claim 1, wherein the first set of slots configured to receive the lines are arranged parallel to each other in the positioning element.

3. The system as claimed in claim 1, wherein at least one hole is provided in the positioning element to pass a screw through and to screw the screw into the expansion valve.

4. The system as claimed in claim 1, wherein the housing comprises injected-molded plastic such that the housing and the projections are formed by a single piece of injection molded plastic.

* * * * *